United States Patent
Jordan et al.

[15] 3,652,984
[45] Mar. 28, 1972

[54] PRESSURE SIGNALLING APPARATUS FOR TIRES

[72] Inventors: Leslie H. Jordan, 2021 East Broadway, Vancouver, British Columbia; John Arden, 6049 Portland Avenue, Burnaby, British Columbia, both of Canada

[22] Filed: Jan. 15, 1970

[21] Appl. No.: 3,076

[52] U.S. Cl. ............................................340/58, 200/61.25
[51] Int. Cl. ......................................................G08b 21/00
[58] Field of Search ...........340/58; 200/61.22, 61.23, 61.25, 200/61.26

[56] References Cited

UNITED STATES PATENTS

| | | | |
|---|---|---|---|
| 2,710,391 | 6/1955 | Trinca | 340/58 |
| 2,347,541 | 4/1944 | Critser et al. | 340/58 |
| 2,057,387 | 10/1936 | Loeb | 340/58 UX |

Primary Examiner—Alvin H. Waring
Attorney—Fetherstonhaugh & Co.

[57] ABSTRACT

Apparatus having a bolt movable from a normally retracted position to a released signal operating position. A latch normally holds the bolt in the retracted position and a trigger arrangement controls the latch. An air gauging device, associated with a valve through which a tire is charged to a selected air pressure, is coupled to the trigger to operate same thereby actuating the latch and releasing the bolt when air pressure in the tire falls a predetermined amount below the selected level.

3 Claims, 6 Drawing Figures

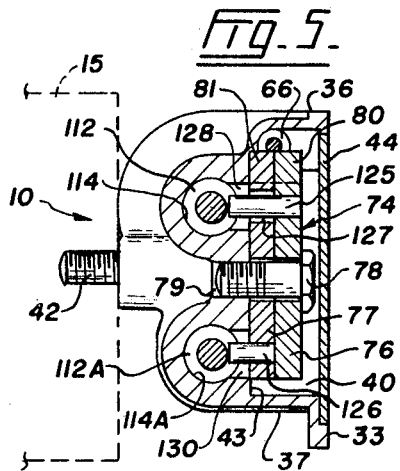
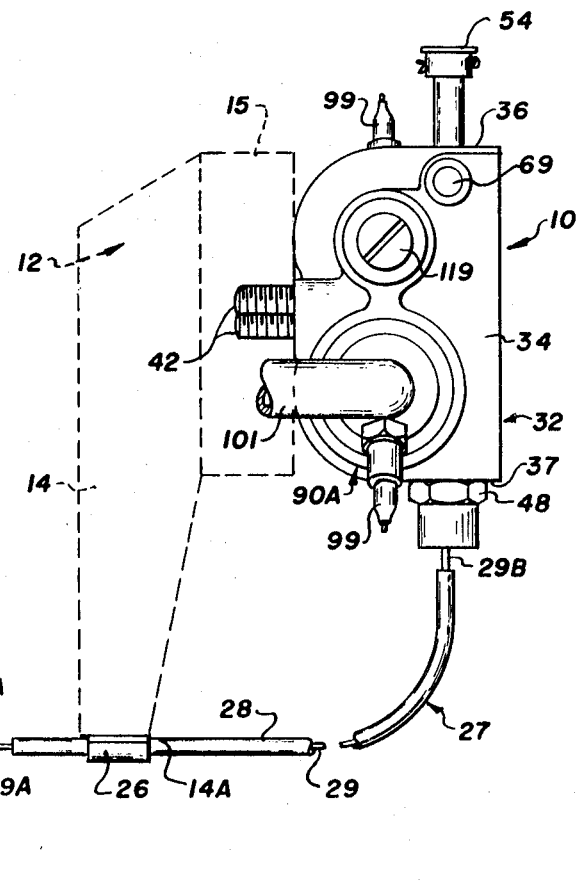

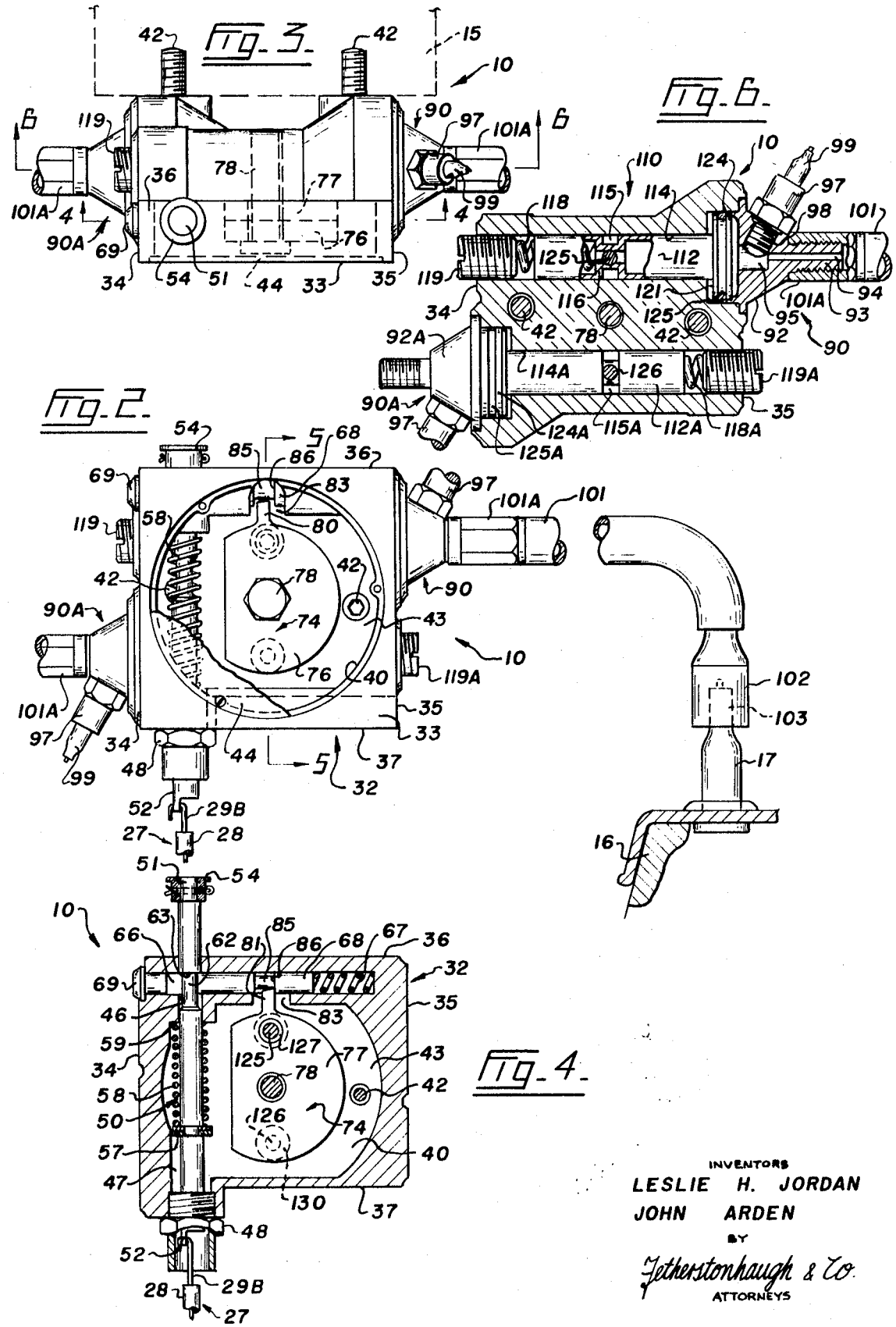

PRESSURE SIGNALLING APPARATUS FOR TIRES

BACKGROUND OF THE INVENTION

Our invention relates to apparatus for operating a signal to warn the driver of a vehicle the air pressure in a tire has dropped below a safe level.

In order to provide a signalling device which will warn the driver of the loss of tire pressure, a number of important requirements must be met if the device is to be completely effective. For example, the device should be ruggedly constructed to withstand a great deal of rough usage; it should be sensitive enough to detect a normal variation in tire pressure from a serious pressure drop; it should be adjustable to operate under varying conditions; it should not interfere with the balance of the wheel; nor should it provide an obstruction to normal inflation of the tire and the periodic checks which must be made of the tire pressure.

SUMMARY OF THE INVENTION

Our invention fulfills all the above mentioned as well as other requirements of the signalling device by providing a unit which can readily be installed in a balanced position in the center of a wheel. The present device is directly connectable to the valves of dual wheel tires in such a way that said tires can be inflated and periodically checked through the unit itself without the necessity of disconnecting any parts other than the normal valve caps. By balancing the pressure of the tire against the pressure of an adjustable spring, the device is made extremely sensitive while being suitable for use on a wide range of tire sizes and pressures. The moving parts of the device are supported by a heavily constructed housing in such a way as to be protected from damage incidental to road shock and other causes, whereby the device is assured of an exceptionally long operational life.

BRIEF DESCRIPTION OF THE DRAWINGS

FIG. 1 is a part side elevation, part schematic view, showing a dual wheel with the present apparatus mounted thereon, in accordance with the present invention, FIG. 2 is a part front elevation of the apparatus, with part of the housing body cover broken away, and the cocking bolt in released position,

FIG. 3 is a plan,

FIG. 4 is a vertical section taken on the line 4—4 of FIG. 3,

FIG. 5 is a transverse section taken on the line 5—5 of FIG. 2, and

FIG. 6 is a vertical section taken on the line 6—6 of FIG. 3.

DESCRIPTION OF THE PREFERRED EMBODIMENTS

Referring to the drawings, the pressure signalling apparatus for tires is indicated generally by the numeral 10. In FIG. 1 and 2, apparatus 10 is shown by way of example mounted on a dual wheel 12 of a truck, the wheel having a brake drum 14 and an axle end cap 15. The dual wheel 12 is fitted with pneumatic tires 16 (one only shown in FIG. 2) and each tire has the usual air valve 17. Apparatus 10 comprises an electric circuit 20 (FIG. 1) which includes the truck battery 21; a suitable signalling device 22 which may give a visual or audible signal, or both; a normally closed switch 23 and a normally open switch 24. Both the device 22 and the switch 23 are mounted in the cab of the truck. Switch 24 is mounted on some convenient stationary part of the truck near the wheel 12, for example, it may be secured to the rear axle housing (not shown) in a position near the outer periphery 14A of the brake drum.

Suitably secured as at 26 to the periphery 14A of the brake drum, is one end of a Bowden cable 27 or the like, the cable having an outer casing 28 which encloses a push-pull wire 29. The cable 29 passes through one of several openings normally found in the wheel 12 and extends to a housing body 32 which contains a number of the moving parts of the apparatus 10. As will be described in detail later, the operation of these parts is such that, when the air pressure in either of the tires 16 is normal, the inner end 29A of the push-pull wire is clear of the switch 24. Should pressure in either tire drop a predetermined amount below this normal or selected pressure level, then the parts within body 32 operate to extend the wire 29 slightly so that the end 29A thereof engages and closes contact arm 24A of the switch. This energizes the circuit 20 and causes the device 22 to light up or sound an alarm which will warn the vehicle driver a tire is underinflated.

Referring particularly to FIG. 2, the housing body 32, which preferably is an aluminum casting, will be seen to have a plane outer face 33, parallel side edges 34 and 35, and end edges 36 and 37. A substantially circular well 40 is formed in the face 33 and suitably spaced and countersunk bolts 42 extend through bottom wall 43 of said well to secure the housing body 32 to the axle end cap 15, see particularly FIGS. 1 and 5. The well 40 is fitted with a cover 44 which seals off the well and protects the parts contained therein from dirt and moisture.

Referring now to FIG. 4, the body 32 is drilled to provide vertically aligned openings 46 and 47 which extend into the well 40. Slidably mounted in the opening 46, and in a tubular fitting 48 threadedly secured within the opening 47, is a cocking bolt 50, the opposite ends 51 and 52 of which project beyond the edges 36 and 37 of the housing body. End 51 is fitted with a knob 54 which allows the bolt end to be gripped by the fingers. Suitably secured to reduced end 52 of the cocking bolt 50, is an end 29B of the push-pull wire of the Bowden cable 27. Near end 52, the cocking bolt 50 is provided with a removable collar 57 and a coil spring 58 is mounted on said bolt between this collar and a shoulder 59 formed on the body 32 within the well 40. Above the spring 58, bolt 50 has a wide annular groove 62 which provides an upper shoulder 63 perpendicular to the longitudinal axis of said bolt.

The opening 46 is intersected at right angles by a blind hole 66 which is drilled into the body 32 from side edge 34. A small compression spring 67 is housed within the blind end of the hole 66 and this spring bears against a latch pin 68 to urge said pin outwardly of the hole and into sliding contact with the bolt 50. Preferably, a cap 69 is secured within the open end of the hole 66 to provide a proper seal against dirt and moisture.

Bolt 50 is adapted to be pulled upwardly out of the housing body 32 until the latch pin 68 is snapped into the groove 62 so as to engage the shoulder 63. The pin 68 then retains the bolt 50 in this extended or cocked position which is shown best in FIGS. 1 and 4. At this time, end 29A of the Bowden wire is clear of the switch 24. Whenever the latch pin 68 is withdrawn from engagement with the shoulder 63, the bolt 50 is snapped by the spring 58 to the retracted or released position shown in FIG. 2. This movement of the cocking bolt 50 extends the end 29A of the Bowden wire so that it engages the arm 24A to close the normally open switch 24.

The apparatus 10 includes trigger means generally indicated at 74 for operatively engaging the latch pin 68 and moving said pin out of latching engagement with the bolt 50. As shown in FIGS. 2, 4 and 5, the trigger means 74 comprises two discs 76 and 77 which are housed within the well 40. These two discs have limited and independent rotation about a central bolt 78 which is threaded into a hole 79 (FIG. 5) formed in the bottom wall 43 of the well. Radially projecting fingers 80 and 81 are provided on the discs 76 and 77. The side wall of the well 40 has an enlarged slot 83 which communicates with the blind hole 66. The fingers 80 and 81 project freely through the slot 83 into the hole 66 with the tips of said fingers being received in an annular groove 85 formed on the latch pin 68. Groove 85 provides the pin 68 with a shoulder 86 which is engaged by the fingers 80 and 81 when said pin is in latching engagement with the cocking bolt 50 as shown best in FIG. 4.

Apparatus 10 is provided with valve means generally indicated at 90 which is adapted to be connected to the valve stem 17 of the tire whereby that tire can be inflated to a selected pressure suitable for normal operation of the vehicle. As shown best in FIG. 6, the valve means 90 comprises a fitting 92 which is suitably secured to side edge 35 of the housing body. The fitting 92 has an externally threaded stem 93 and a bore 94 of said stem connects with a recess 95 formed in the inner face of said fitting. A tubular adapter 97 is threaded into an opening 98 formed in the fitting 92 to connect with the recess 95 and secured to this adapter is a conventional valve stem 99 of the type used on a truck wheel. A length of rubber hose 101 is attached to the stem 93 by means of a suitable swivel connector 101A and this hose is extended to a tire valve 17 on one of the dual wheels, see FIG. 2. Hose 101 is connected to stem 17 by a threaded connector 102 which depresses or opens the usual valve 103 carried by said stem when said connector is attached thereto. Thus, the tire 16 can be filled with air to a selected pressure from the valve stem 99 without the need to disconnect the hose 101 by removing the connector 102.

Since this embodiment of the invention is intended for use on dual wheels, another valve means generally indicated at 90A is provided on the side edge 34 of the housing body. This valve means 90A is identical to the means 90 and therefore will not be described in detail. A rubber hose 101A connects the duplicate valve means to the other tire of the dual wheel in the same manner as before.

Air gauging means generally indicated at 110 communicates with the valve means 90 and is operatively connected to the trigger means 74. Referring again to FIG. 6, means 110 comprises a sleeve 112 which is slidably mounted in a bore 114, the bore extending through from side edge 34 to side edge 35 of the housing body. Sleeve 112 has a peripheral groove 115 and an inwardly projecting flange 116. A spring 118 bears against flange 116 and projects outwardly of the sleeve to press against a plug 119 which is threaded into the through bore 114 from side edge 34. Side edge 35 is counterbored to provide a shallow cylinder 121 which connects with the bore 114 and the fitting 92 forms a head for this cylinder. A relatively thin piston 124 is mounted in the cylinder 121 and this piston preferably is fitted with a rubber O-ring 125 to serve as a sealing member. The selected air pressure within the tire 16 forces the piston 124 inwardly until it seats against the bottom of the cylinder 121. This movement of the piston forces the sleeve 112 inwardly also and compresses the spring 118. The shoulder 86 on the latch pin 68 at this time is in contact with the finger 80 on disc 76. In other words, the latch pin 68 has been allowed to be moved inwardly by its spring 67 into latching engagement with the bolt 50. It should be noted that bolt 50 cannot be latched in cocked position until the pressure of air on the piston 124 is greater than the force exerted by the spring 118.

As in the case with the trigger means 74 and the valve means 90, the pressure gauging means 110 is duplicated for use on a dual wheel and again these identical parts will not be described in detail but where they appear on the drawing, they will be identified by the same numerals and the letter A. The through bore 114A, of course, extends into the side edge 35 of the housing body opposite the valve means 90A.

The trigger means 74 and the air gauging means 110 are interconnected by pins 125 and 126, see particularly FIG. 5. These pins are secured to the discs 76 and 77 respectively, to project inwardly therefrom. Disc 77 has an enlarged opening 127 which registers with a similar opening 128 formed in the bottom wall 43 of the well. The connector pin 125 extends through these openings 127 and 128 into the bore 114 and also into the groove 115 in the sleeve 112. The other connector pin 126 which is carried by the second disc 77 projects through an enlarged opening 130 formed in the bottom wall 43 of the well and into the other bore 114A to operatively engage the second sleeve 112A as previously described.

In describing the operation of the apparatus 10, for the sake of brevity, only those parts which are influenced by the pressure of tire 16 will be dealt with but it will be understood that the same sequence of events takes place when pressure of the second tire of the dual wheel drops a predetermined amount.

Assuming that tire 16 loses, say, 30 pounds of air pressure, this drop is sufficient to allow spring 118 to push the sleeve 112 and piston 124 outwardly of bore 114 and cylinder 125. Outward movement of sleeve 112 is transmitted by connector pin 125 to disc 76 whereupon said disc is rotated a few degrees clockwise as shown in FIG. 4, for example. The finger 80 of disc 76 pushes against shoulder 86 and moves the latch pin 68 out of engagement with the bolt 50. The cocking bolt 50 is snapped to released position by its spring 58 and this results in the push-pull wire 29 being moved into engagement with the normally open switch 24. The closing of switch 24 causes the signal 22 to operate and warn the driver of this loss of pressure in tire 16. The same warning signal is given by the apparatus 10 whenever there is a predetermined drop of pressure within the other tire of the dual wheel.

The apparatus 10 is readily adjusted for use on tires of differing operating pressures and to respond to different predetermined pressure drops. The plug 119 has a very fine thread which enables it to be advanced into or backed out of the bore 114 by very small increments. By adjustment of the plug 119, a very precise balance can be struck between air and spring pressure so that the apparatus will operate effectively on a number of different vehicles and under varying conditions. Apparatus 10 may be used on a truck having single tired wheels simply by omitting one of the rubber hoses and, if desired, blocking off the head fitting 92 to which that hose normally would be connected. Alternatively, a modified apparatus may be used with the duplicate parts of the trigger means 74, valve means 90, and air gauging means 110 all omitted.

When the alarm sounds to indicate a drop in tire pressure, the driver has ample time to pull the vehicle to the side of the road to check the wheels. If the driver decides the underinflation is not serious enough to prevent him reaching his destination, he opens switch 23 to render the apparatus 10 inoperative since it is not possible to recock the bolt 50 and shut off the alarm as long as the predetermined drop exists and is sensed by the air gauging means 110. The means 110 will keep the latch pin 68 retracted out of engagement with the bolt 50 and therefore said bolt cannot be recocked.

We claim:

1. Apparatus for signalling a pressure drop in a pneumatic tire comprising a housing body, a bolt slidably mounted in the body for movement between a cocked position and a released position, spring means for urging the bolt towards the released position whereby to cause the operation of a signalling means, a latch pin having a shoulder and being mounted in the body to engage and retain the bolt in cocked position, trigger means operatively engaging the latch pin and including a disc rotatably mounted in the body, said disc having a radial finger adjacent the shoulder when the latch pin is in latching engagement with the bolt, air pressure gauging means in the body and including a through bore and a cylinder at one end thereof, valve means mounted on the body and being connectable to a valve stem of the tire to permit inflation of said tire to a selected pressure, said valve means including a fitting forming a head for the cylinder, said air pressure gauging means having a piston mounted in the cylinder, a sleeve member slidably mounted in the through bore, a plug threadedly secured within an end of the through bore opposite the cylinder, a compression spring interposed between the plug and the sleeve member to bias said piston outwardly of the cylinder, said piston being forced inwardly by air pressure common to both the valve means and the tire to compress the compression spring, a connector pin operatively connecting the sleeve member to the disc, said compression spring moving the sleeve member outwardly when the force applied to the piston by the tire pressure drops below a predetermined level, said outward movement of the sleeve member withdrawing the latch pin thereby allowing the bolt to move from cocked position to released position.

2. Apparatus as claimed in claim 1, and including a second trigger means, a second air pressure gauging means, and a second valve means carried by the housing body, said second valve means being connectable to a tire valve of a second tire forming a dual wheel with the first mentioned tire thereby to permit inflation of said second tire to a selected air pressure, said second air pressure gauging means being operatively connected to the second trigger means whereby said second trigger means is actuated with the aforesaid result in response to a predetermined drop in pressure within the second tire of the dual wheel.

3. Apparatus as claimed in claim 1, and including a knob secured to the bolt externally of the body whereby said bolt can be moved manually from the released position to the cocked position.

* * * * *